Patented June 2, 1953

2,640,756

UNITED STATES PATENT OFFICE 2,640,756

MANUFACTURE OF TETRASILICATES

John H. Wills, Chester, Pa., assignor to Philadelphia Quartz Company, Philadelphia, Pa., a corporation of Pennsylvania No Drawing. Application February 9, 1948, Serial No. 7,303

11 Claims. (Cl. 23—111)

This invention relates to manufacture of tetrasilicates; and it comprises a process of making various tetrasilicates which comprises contacting a solid crystalline tetrasilicate compound having an exchangeable cation, such as sodium tetrasilicate, with an aqueous solution of an electrolyte which contains another cation in solution and which has a pH value favorable to cation exchange, and keeping the tetrasilicate compound in contact with said solution until cation exchange has taken place, whereby a tetrasilicate of said other cation is formed.

The invention also includes the birefringent cation-exchange products produced by the described process, these products having the formula

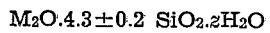

$$M_2O \cdot 4.3 \pm 0.2\ SiO_2 \cdot xH_2O$$

wherein M represents a chemical equivalent of at least one positive element other than Na, and $xH_2O$ represents water of hydration which may vary from about 1.5 to 7 molecules when dried at 115° C., said products having the property of being able to exchange cations with solutions of electrolytes, being crystalline compounds with particle sizes ranging in long dimension from about 0.5 to 15 microns, having a resistance toward acid solutions which is several times that of the conventional synthetic siliceous zeolites, having a surface area, which depends upon the particle size of the crystals, ranging from about $1 \times 10^6$ to $22 \times 10^6$ square centimeters per gram, a surface hardness above about 6.5 on the Moh scale and an absorptivity for water ranging from about 2 to 45% by weight at a relative humidity of 100%; all as more fully hereinafter set forth and as claimed.

In the U. S. Patent No. 2,179,806, Walter F. Wegst and I described a hydrated tetrasilicate of sodium which at that time was a new product. This compound was said to have the formula $Na_2O \cdot 4SiO_2 \cdot xH_2O$, wherein $x$ is an integer less than 7. Subsequent and more accurate analyses of this product have demonstrated that its ratio of $Na_2O$ to $SiO_2$ is not exactly 1 to 4. In the patent it is explained that the methods of analysis available to determine the molecular ratio of $Na_2O$ to $SiO_2$ in such products leave much to be desired and that for this reason the ratio could not be stated with any great certainty. In view of the more recent analyses of this product I consider that the ratio of $Na_2O$ to $SiO_2$ is more accurately stated as being 1 to $4.3 \pm 0.2$.

In experimenting with this product I have made the surprising discovery that it has base exchange properties and that the sodium present can be replaced not only by other metal atoms, such as calcium, aluminum, copper and vanadium and organic cations such as quaternary ammonium, tetraethanol ammonium, cetyl pyridinium, dimethyloctodecylamine, stearyl amine, isopropyldodecylamine etc., but also with hydrogen. This latter discovery is particularly surprising since this appears to be the first crystalline hydrogen silicate which has been reported in the literature. Upon replacement of the sodium of the sodium tetrasilicate with other cations the crystalline structure of the tetrasilicate is ususally not destroyed and therefore the final size and shape of the particles are usually determined by the size and shape of the original sodium tetrasilicate crystals. In fact the only atom which apparently causes the tetrasilicate crystals to disintegrate is the large uranium atom but even in this case the disintegrated product shows birefringence indicating crystallinity. Other methods such as quenching or rapid heating in a flame can be used to reduce particle size but these usually destroy the crystalline structure.

The new hydrogen tetrasilicate can be formed in a very pure state by merely treating sodium tetrasilicate with a dilute acid solution having a pH not substantially exceeding 4 under conditions favoring cation exchange. The resulting product has not only definite indices of refraction in at least two directions but X-ray diffraction patterns leave no doubt that the product is crystalline and definitely not a form of hitherto-known silica.

This hydrogen tetrasilicate has two refractive indices which are close together and one of which has the value of about $1.46 \pm 0.02$ and the other about $1.48 \pm 0.01$. Most of its particles fall within the size of from 0.5 to 15 microns. It can be employed as a mineral hydrogen exchange material (hydrogen zeolite). Its hardness and particle size enables its use as a so-called dust insecticide, indicated for use against the rice weevil, flour beetles, the Mediterranean flour moth, the fig moth, the cocoa moth, spider beetles and bed bugs. It has high absorbent properties for various types of gases and liquids and can be used as a drying agent, for removing disagreeable tastes from potable water, for selectively adsorbing gases and vapors, and as a chromatophore in chromatic analysis. It is useful as a flatting agent and surface hardener in paints, as a so-called surface catalyst and as a catalyst carrier. And it can be used for concentrating and separating various vitamins, pharmaceuticals and proteins from impure dispersions thereof.

The tetrasilicates of the metals falling in groups II to VIII of the periodic table can all be prepared by the methods herein described and for many purposes these are much more advantageous than the alkali metal tetrasilicates. They are less soluble, their alkalinity is lower, they have higher refractive indices and they can be formed more rapidly from sodium tetrasilicate. In addition these metal tetrasilicates have different utilities most of which are dependent upon the metal atoms which replace the sodium. Many striking examples could be given. For example, several of these tetrasilicates are useful as pigments and fillers in paints, inks, plastics, ceramics etc. Copper tetrasilicate has a light blue color; iron tetrasilicate is a light brown and uranium tetrasilicate is yellow. The copper, silver and arsenic tetrasilicates are useful as insecticides and/or fungicides. The platinum, nickel, copper, vanadium etc. tetrasilicates are useful as catalysts. Silver and copper tetrasilicates can be used as sterilizing agents in protecting water supplies from disease germs. The calcium and iron tetrasilicates can be used for preventing corrosion in hot water systems. They can be used for concentrating and recovering metal values from dilute solutions. A large number of other uses for these compounds could be enumerated which would be evident to those skilled in the art from the description of their properties as given herein.

It is believed that the present discovery of the base exchanging properties of sodium tetrasilicate represents the first finding reported in the literature of a birefringent sodium silicate material having the property of base exchange without losing its birefringence and the first reported case of a crystalline sodium silicate having base exchanging properties. The synthetic zeolites, in contrast, are not birefringent and do not have any definite compositions.

The metal tetrasilicates produced by base exchange with sodium tetrasilicate in accordance with the present invention appear to be of the nature of mixed crystals. Their compositions can be varied continuously from one representing sodium tetrasilicate, for example, containing a trace of other metal to one representing another metal tetrasilicate containing only a trace of sodium. And surprisingly it is possible to produce metal tetrasilicates in which the ratio of metal oxide to $SiO_2$ is considerably higher than 1:4.3. I believe that these compositions are metal tetrasilicates in which metal ion is adsorbed. This conclusion is supported by the fact that the tetrasilicates of the heavy metals can be readily made containing an excess of metal over the 1:4.3 ratio by contacting sodium tetrasilicate with even dilute solutions of the heavy metal salts. Heavy metal and hydrogen ions are, of course, known to be more readily adsorbed than the ions of light metals. Mixed hydrogen-metal tetrasilicates can be usually produced by conducting the cation exchange in solutions which have an acid reaction.

My invention can be described more accurately by reference to the following specific examples which represent practical operating embodiments of processes within the present invention and useful in making my new products.

*Example 1.—Hydrogen tetrasilicate*

A filter cake of sodium tetrasilicate, prepared as described in U. S. Patent No. 2,179,806 and weighing 560 pounds, was slurried with water and HCl was added until Methyl Orange indicator gave a red end-point which did not disappear. After standing several hours additional acid was required and acid was added at intervals until the mixture retained its pink end-point for two days. This required 570 liters of commercial concentrated HCl. The resulting slurry was filtered off and the filter cake was slurried four times in about 9,000 gallons of wash water to remove residual salt and acid. It was also washed on the filter press at each filtration step. The product was then lightly pulverized and dried in an air stream at 45° to 50° C. After this treatment it contained 14.2% water as determined by loss upon ignition. Upon drying at 300° C. a sample contained only 2.7% moisture. The latter sample was exposed to the air for some time during which time it absorbed some moisture from the air. An analysis of this product gave the following results:

| | Per cent |
|---|---|
| $SiO_2$ | 93.9 |
| Ignited loss | 4.6 |
| Cl | 0.2 |
| Ca and Mg | 0.1 |
| $R_2O_3$ | 1.2 |
| Total | 100.0 |

The $R_2O_3$ in the above analysis represents the content of heavy metals, iron, aluminum, titanium etc. separated during the analysis. The hydrogen tetrasilicate product obtained as described was found to be birefringent, one refractive index being about 1.47 and the other about 1.49. The apparent density was 0.26 g./ml. closely packed and 0.14 g./ml. untamped. The true gravity was found to be 2.34 g. per cc. This product was heated to a temperature of 300° C. without melting. A spectrographic analysis showed less than 0.01% of each of aluminum, calcium, sodium and titanium, about 0.01% of copper. The high iron content was derived from the use of an iron filter press.

*Example 2.—Hydrogen tetrasilicate*

Another sample of hydrogen tetrasilicate was prepared by refluxing a batch of sodium tetrasilicate crystals with an excess of 4 N. hydrochloric acid for a period of 24 hours. The resulting product was washed with water 8 times for considerable periods. The refractive index of this product was difficult to determine but appeared to be about 1.43 to 1.44. The particles were birefringent both before and after drying at 275° C. The anhydrous material absorbed 25% of water at 100% humidity. It was estimated from the amount of water absorbed in this fashion that the product had a specific surface of about $11 \times 10^6$ sq. cm. per gram. The shape and size of the particles appeared to be the same as those of the original sodium tetrasilicate. The true specific gravity was found to be 2.34. This product had the following analysis:

| | Per cent |
|---|---|
| $SiO_2$ | 96.21 |
| Ignited loss | 3.70 |
| Metallic oxides (by difference) | 0.09 |

The ignited loss was determined after drying over night at 275° C.

*Example 3.—Hydrogen tetrasilicate*

Another batch of sodium tetrasilicate crystals was agitated for a period of 36 hours with an excess of sulfuric acid having a concentration of about 10 per cent. The material was filtered off, thoroughly washed and dried under an infra red lamp. An analysis after further drying at 120° C. for 4 days gave the following results:

| | Per cent |
|---|---|
| $SiO_2$ | 84.1 |
| Ignition loss | 14.9 |
| $Fe_2O_3$ | 0.1 |
| $Al_2O_3$ | 0.1 |
| $Na_2O$ | 0.2 |
| $SO_3$ and Cl | 0.3 |
| Total | 99.7 |

The refractive indices of this product were found to be about 1.46 and 1.47.

It has been found that when sodium tetrasilicate is titrated with a dilute acid, such as 2 N hydrochloric acid, about 20% of the sodium present in the tetrasilicate can be titrated within one minute at room temperature, about 45% in 45 minutes and 66% in one hour. If the titration is conducted at the boiling point about 66% can be titrated in 2 minutes, 90% in 15 minutes and about 95% in two hours. If the sodium tetrasilicate is added to an acid solution, on the other hand, a protective film appears to form and complete neutralization is delayed for some time. At room temperature, for example, only 30% can be titrated in 2 hours and 55% in five hours. At the boiling point 66% can be titrated in 2 hours and 99% in 5 hours.

The hydrogen tetrasilicate produced as described above is a birefringent crystalline product with particles the bulk of which are between 1 to 5 microns, some being smaller or larger depending upon the size of the original crystals and having refractive indices of about $1.46 \pm 0.02$ and $1.48 \pm 0.01$, having an apparent density of about 0.26 g. per ml. when closely packed and about 0.14 g. per ml. when untamped, having a true specific gravity of about 2.34, a specific surface of the order of $11 \times 10^6$ sq. cm. per gram, having a surface hardness on the Moh scale above 6.5 and containing from about 2 to 7 molecules of water when dried at 115° C.

Example 4.—Nickel tetrasilicate

Nickel tetrasilicate was prepared by agitating for 36 hours a mixture of 25 parts by weight of hydrated sodium tetrasilicate, 200 parts of water and 26.8 parts by weight of $NiSO_4 \cdot 6H_2O$, expressed as NiO. The resulting mixture was filtered and dried under suction. The filtrate showed only traces of nickel to the dimethylglyoxime test. The nickel tetrasilicate was thoroughly washed and then dried at a temperature of 115° C. It was pale greenish in color and birefringent. Upon analysis it was found to have the following composition:

| | Per cent |
|---|---|
| NiO | 13.06 |
| $SiO_2$ | 63.03 |
| $H_2O$ | 16.43 |
| $Na_2O$ | 7.84 |

A nickel tetrasilicate containing only traces of Na can be obtained by employing an excess of nickel sulfate in the solution with which the sodium tetrasilicate is treated.

Example 5.—Aluminum tetrasilicate

An aluminum tetrasilicate was prepared by agitating for a period of 8 hours a batch of hydrated sodium tetrasilicate with an excess of an aqueous solution of aluminum sulfate having a pH of 3. The resulting material was filtered off and dried at a temperature of 115° C. An analysis of the aluminum tetrasilicate yielded the following results:

| | Per cent |
|---|---|
| $Al_2O_3$ | 4.8 |
| $SiO_2$ | 78.06 |
| $H_2O$ | 15.57 |
| $Na_2O$ | 1.57 |

Example 6.—Copper tetrasilicate

A solution of copper sulfate in water having a pH of about 6.0 was agitated and reacted with hydrated sodium tetrasilicate. Copper was determined as cuprous thiocyanate. The original solution contained the equivalent of 0.0204 g. copper per ml., while the solution after exchange with the tetrasilicate contained only 0.000016 g. copper per ml. Analysis of the solid phase yielded:

| | |
|---|---|
| CuO | 22.07 |
| $SiO_2$ | 53.49 |
| $H_2O$ | 22.37 |
| $Na_2O$ by difference | 2.07 |

Example 7.—Iron tetrasilicate

A solution of copperas $(FeSO_4 \cdot 7H_2O)$ was agitated and reacted with a batch of sodium tetrasilicate. Iron was determined by precipitation as the hydroxide and ignition to $Fe_2O_3$. The original solution contained the equivalent of 0.0252 g. $Fe_2O_3$ per ml. After 24 hours agitation a slimy precipitate of $Fe(OH)_2$ had formed and served to prevent any further absorption of iron by the tetrasilicate. The mixture was accordingly brought to a pH of 3–4 by adding concentrated hydrochloric acid and the mixture was again agitated for 24 hours. The solid phase was collected and dried at 115° C. The solution after reaction with the tetrasilicate contained the equivalent of 0.0173 g. $Fe_2O_3$ per ml. The solid phase analysis yielded:

| | |
|---|---|
| $Fe_2O_3$ | 8.59 |
| $SiO_2$ | 79.93 |
| $H_2O$ | 9.16 |
| $Na_2O$ by difference | 2.32 |

The water present in this product corresponds to 1.6 moles to 4.3 moles of $SiO_2$.

Example 8.—Zinc tetrasilicate

A solution of zinc acetate dihydrate was agitated with a slurry of sodium tetrasilicate. Zinc was determined as zinc ammonium sulfate. The original solution contained the equivalent of 0.0215 gram of zinc oxide per ml. at pH 6. After exchange the solution contained the equivalent of 0.0018 gram of zinc oxide per ml. at pH 7. The analysis of the solid phase showed:

| | |
|---|---|
| ZnO | 18.77 |
| $SiO_2$ | 65.90 |
| $H_2O$ | 9.99 |
| $Na_2O$ by difference | 5.34 |

Example 9.—Calcium tetrasilicate 14.5 parts of technical anhydrous $CaCl_2$ were dissolved in about 150 parts of distilled water. Then 25 parts of finely powdered sodium tetrasilicate were added and the mixture was refluxed at boiling temperature for twenty three hours. The product was then filtered off and the cake washed until practically free from soluble calcium salt. The original filtrate had a pH value as shown by Hydrion paper of 7 or 8.

The washed product was dried at room temperature and the following analysis was obtained:

| | Per cent |
|---|---|
| CaO | 14.71 |
| $SiO_2$ | 67.74 |
| Ignited loss | 15.15 |
| Residue by difference | 2.40 |

This product was birefringent and one index of refraction was determined of about 1.472. If the crystals had more than this one index the differences between them must have been small. The crystals were too small for an accurate determination.

*Example 10.—Yttrium tetrasilicate*

A solution of yttrium chloride was prepared by dissolving $Y_2O_3$ in aqua regia. Yttrium was precipitated as the oxalate and ignited and weighed as $Y_2O_3$. The original solution contained 0.0693 g. of $Y_2O_3$ per ml. at a pH of 1–2. The solution after exchange contained 0.0370 g. $Y_2O_3$ per ml. at pH 4. The analysis of the solid phase yielded:

| | |
|---|---|
| $Y_2O_3$ | 16.53 |
| $SiO_2$ | 55.87 |
| $H_2O$ | 19.68 |
| $Na_2O$ by difference | 7.92 |

*Example 11.—Tin tetrasilicate*

A solution of stannic chloride was used for exchange. The tin content was determined by precipitation of stannous oxide by boiling the alkaline solution in the presence of massive quantities of ammonium nitrate. The solution before exchange contained the equivalent of 0.048 g. SnO per ml. at pH 1–2, while the solution after exchange contained the equivalent of 0.043 g. SnO per ml. Analysis of the solid phase yielded:

| | |
|---|---|
| SnO | 1.60 |
| $SiO_2$ | 73.26 |
| $H_2O$ | 18.02 |
| $Na_2O$ by difference | 7.12 |

The product obtained in this example is obviously a mixed hydrogen-tin tetrasilicate which is evident from the low content of tin. This was caused by the use of a tin solution having too low a pH. I have found that there is a tendency towards the formation of mixed metal-hydrogen tetrasilicates in this fashion whenever the metal salt solution used for exchange purposes has a pH value below about 6. For maximum metal content it is usually necessary to employ metal salt solutions having a pH not substantially below 4. Mixed hydrogen-metal tetrasilicates are usually formed within the pH range of about 1 to 6.

*Example 12*

In this example a test was run to determine the cation exchanging properties of my hydrogen tetrasilicate. To produce a sample of hydrogen tetrasilicate a batch of sodium tetrasilicate was agitated for an hour with an excess (100% over the total $Na_2O$ equivalent) of 2N. hydrochloric acid at room temperature. The residual acid was titrated and compared with the original 2N. acid and it was found that the entire estimated $Na_2O$ content of the tetrasilicate had been replaced. The resulting hydrogen tetrasilicate was washed several times with water and then treated with an excess of a sodium chloride solution containing 30 parts NaCl dissolved in 100 parts water. The pH of the brine solution was measured both before and after the treatment and it was found that the pH decreased by 2.2 pH units. This indicates that only a slight regeneration was produced by the brine. But upon treatment of the hydrogen tetrasilicate with 2N. NaOH solution for 75 minutes it was found that 74% of the original $Na_2O$ in the sodium tetrasilicate had been regained.

The above tests show that it is possible to use the new hydrogen tetrasilicate in cation exchanging operations for neutralizing alkaline industrial liquors or the like, the regeneration being effected by dilute acid solutions having pH values not substantially above 3. Conversely sodium tetrasilicate can be used to neutralize industrial acid effluents, regeneration being effected by the use of solutions of sodium compounds having pH values of at least about 8.

A series of comparative tests were run to compare the resistance to regenerating acids of my hydrogen tetrasilicate and a commercial mineral zeolite manufactured by the American Doucil Company and having the approximate formula $Na_2O-Al_2O_3-5SiO_2-xH_2O$. During these tests the regenerating acid used was 2N. sulfuric acid and regeneration was accomplished at boiling temperatures instead of room temperatures. The alkaline liquor treated was 0.2N. sodium hydroxide. In these tests it was found that the commercial zeolite decomposed somewhat more than 3 times as rapidly as my hydrogen tetrasilicate. Thus while it has not been found commercially feasible to regenerate mineral zeolites with acids, thus using them as the so-called hydrogen zeolites, it does appear feasible to employ my new hydrogen tetrasilicates in operations involving the neutralization of caustic industrial liquors and/or the recovery of alkaline organic materials, such as some of the vitamins, pharmaceuticals and proteins from alkaline industrial liquors.

It will be noted that the action of sodium tetrasilicate is quite different from that of commercial mineral zeolites. The latter can be regenerated satisfactorily by the use of neutral brine solutions whereas, in contrast, my calcium and hydrogen tetrasilicates when treated with a brine solution are converted into sodium tetrasilicate only to a very slight extent. But these tetrasilicates have the distinctive property of being converted almost quantitatively into hydrogen tetrasilicates upon treatment with very dilute acids, that is solutions having a pH of about 4 or below.

The tetrasilicates are also more resistant to strong caustic solutions than the commercial mineral zeolites. This combination of properties makes my new tetrasilicates of particular value in the treatment of alkaline liquors for adsorption of cations or the like followed by regeneration by means of weakly acid solutions.

As indicated previously my tetrasilicates can be prepared in substantially pure form from any cation or metal an ionizable salt of which is available that can be obtained in an aqueous solution having a pH not substantially below about 4. Mixed hydrogen-metal tetrasilicates can be produced from salts producing lower pH values when dissolved in water, the proportion of metal present in these tetrasilicates depending upon the pH of the solutions from which they are made, the higher pH values producing tetrasilicates containing the larger proportions of metal. All of these tetrasilicates contain from about 1.7 to 7 molecules of water to 4.3 molecules of SiO₂ when dried at 115° C. Prolonged drying at temperatures above about 250° C. reduces the water content substantially to zero.

The procedure to be employed in producing the base exchange required to produce my tetrasilicates may be varied widely within the skill of the art. The tetrasilicate employed as a raw material in this base exchange may be hydrogen tetrasilicate, sodium tetrasilicate or any other metal tetrasilicate. It is only necessary to contact this raw material with an aqueous solution containing a sufficient concentration of ions of the metal whose tetrasilicate it is desired to form and to adjust the pH of the solution to a value preferably above 4–5. Tetrasilicates of metals in columns II to VIII appear to be formed preferentially in comparison with alkali metal tetrasilicates so in the preparation of the former from the latter it is not necessary to employ as high concentrations of metal in the cation exchanging solution or as high a pH.

Owing to the effect of the pH in my base exchange reactions, the results which are obtained in my process cannot be predicted solely from the relative concentrations of metal ions present. A pH of about 10 is produced when sodium tetrasilicate is contacted with distilled water. This is doubtless due to the presence of a small amount of the tetrasilicate in solution, since the tetrasilicate is, of course, at least slightly soluble. But this may indicate that a small exchange of sodium for hydrogen takes place even at this pH value.

The cation exchange reactions with which we are concerned appear to depend in important degree upon the relative solubilities of the silicates. That is, calcium tetrasilicate is less soluble than sodium tetrasilicate and the former is formed preferentially in comparison with the latter. It thus appears that the rules governing the formation of my tetrasilicates differ considerably from those governing the base exchange reactions of the conventional siliceous zeolites.

While I have described what I consider to be the more advantageous embodiments of my process and products it is evident of course that the specific procedures which have been described can be varied rather widely without departing from the purview of this invention. It is believed that, with the aid of the preceding description and specific examples it would be well within the skill of the art to prepare tetrasilicates of hydrogen as well as tetrasilicates of any of the other known metals, more especially those falling within columns II to VIII of the periodic table. Modifications of my processes and products which fall within the scope of the following claims I consider to be within the scope of my invention.

What I claim is:

1. In the manufacture of tetrasilicates the process which comprises contacting a solid crystalline tetrasilicate compound, having the formula $$M_2O \cdot 4.3 \pm 0.2 SiO_2 \cdot zH_2O$$

wherein M represents a chemical equivalent of an exchangeable positive element and $zH_2O$ represents water of hydration varying within the range of from about 1.5 to 7 molecules, with an aqueous solution of an electrolyte containing a cation of another positive element in solution, and keeping the tetrasilicate compound in contact with said solution until cation exchange has taken place.

2. In the manufacture of metal tetrasilicates, the process which comprises contacting solid crystalline sodium tetrasilicate, having the formula $$Na_2O \cdot 4.3 \pm 0.2 SiO \cdot zH_2O$$

wherein $zH_2O$ represents water of hydration varying within the range of from about 1.5 to 7 molecules, with an aqueous solution of an ionizable metal salt other than a sodium salt having a pH not substantially below 4, and keeping the tetrasilicate in contact with said solution until cation exchange has taken place.

3. In the manufacture of hydrogen tetrasilicate, the process which comprises contacting a solid crystalline metal tetrasilicate, having the formula $$M_2O \cdot 4.3 \pm 0.2 SiO_2 \cdot zH_2O$$

wherein $M_2O$ represents a chemical equivalent of an exchangeable metal and $zH_2O$ represents water of hydration varying within the range of from about 1.5 to 7 molecules, with an excess of an aqueous solution of an acid having a pH below a value of about 3, keeping said tetrasilicate in contact with said acid solution until cation exchange has taken place and recovering the resulting hydrogen tetrasilicate.

4. The cation exchange process which comprises contacting sodium tetrasilicate, having the formula $$Na_2O \cdot 4.3 \pm 0.2 SiO_2 \cdot zH_2O$$

wherein $zH_2O$ represents water of hydration varying within the range of from about 1.5 to 7 molecules, with an excess of an aqueous acid solution having a pH not substantially exceeding 3, maintaining the acid solution in contact with the tetrasilicate until the corresponding hydrogen tetrasilicate is formed, then regenerating the sodium tetrasilicate by contacting the hydrogen tetrasilicate with an aqueous solution of a sodium compound having a pH of at least about 8.

5. The cation exchange process which comprises contacting hydrogen tetrasilicate, having the formula $$H_2O \cdot 4.3 \pm 0.2 SiO_2 \cdot zH_2O$$

wherein $zH_2O$ represents water of hydration varying within the range of from about 1.5 to 7 molecules, with an aqueous solution of an alkali metal compound having a pH value of at least about 8, maintaining said liquor in contact with the hydrogen tetrasilicate until the corresponding alkali metal tetrasilicate is formed, then regenerating the hydrogen tetrasilicate by contacting it with an excess of an acid solution having a pH not substantially exceeding 3.

6. In the manufacture of metal tetrasilicates, the process which comprises contacting sodium tetrasilicate, having the formula $$Na_2O \cdot 4.3 \pm 0.2 SiO_2 \cdot zH_2O$$

wherein $zH_2O$ represents water of hydration varying within the range of from about 1.5 to 7 molecules, with an excess of an aqueous solution of a compound of a metal falling within groups II to VIII of the periodic table and having a pH not substantially below 4, maintaining said solution in contact with said tetrasilicate until base exchange has taken place and recovering the resulting metal tetrasilicate.

7. In the manufacture of mixed hydrogen-metal tetrasilicates, the process which comprises contacting sodium tetrasilicate, having the formula $$Na_2O \cdot 4.3 \pm 0.2SiO_2 \cdot zH_2O$$

wherein $zH_2O$ represents water of hydration varying within the range of from about 1.5 to 7 molecules, with an excess of an aqueous solution of the compound of a metal other than sodium having a pH between about 1 and 6, maintaining said solution in contact with said tetrasilicate until cation exchange has taken place and recovering the resulting mixed hydrogen-metal tetrasilicate.

8. As new products birefringent tetrasilicates having the formula $$M_2O \cdot 4.3 \pm 0.02\ SiO \cdot zH_2O$$

wherein M represents a chemical equivalent of at least one positive element other than alkali metal, and $zH_2O$ represents water of hydration which may vary from about 1.5 to 7 molecules when dried at 115° C.; said products having the property of being able to exchange cations with solutions of electrolytes, being crystalline compounds with particle sizes usually ranging from about 0.5 to 15 microns, having a resistance towards acid solutions which is several times that of synthetic siliceous zeolites, having a surface area ranging from about $1 \times 10^6$ to $22 \times 10^6$ square centimeters per gram, a surface hardness above 6.5 on the Moh scale and an absorptivity for water ranging from about 2 to 45% by weight at a relative humidity of 100%.

9. As a new product, hydrogen tetrasilicate $$H_2O \cdot 4.3 \pm 0.2SiO_2 \cdot zH_2O$$

wherein $zH_2O$ represents water of hydration varying within the range of from about 1.5 to 7 molecules, being a birefringent crystalline compound having refractive indices of about $1.46 \pm 0.02$ and $1.48 \pm 0.01$, having a specific gravity of about 2.34, containing from about 2 to 7 molecules of water of hydration when dried at 115° C. and being capable of being converted into corresponding metal tetrasilicates by cation exchange.

10. As a new product, a birefringent crystalline compound which is substantially hydrous aluminum tetrasilicate having a ratio of $Al_2O_3$ to $SiO_2$ corresponding to about ⅓

$$Al_2O_3 \cdot 4.3 \pm 0.2SiO_2$$

containing from about 2 to 7 molecules of water of hydration when dried at 115° C. and being capable of being converted into other metal tetrasilicates by cation exchange.

11. As a new product, a birefringent crystalline compound which is substantially hydrous calcium tetrasilicate having a ratio of CaO to $SiO_2$ of about $1CaO \cdot 4.3 \pm 0.2SiO_2$, containing from about 2 to 7 molecules of water of hydration when dried at 115° C. and being capable of being converted into other metal tetrasilicates by cation exchange.

JOHN H. WILLS.

References Cited in the file of this patent

UNITED STATES PATENTS

| Number | Name | Date |
|---|---|---|
| Re. 23,043 | Wegst et al. | Oct. 5, 1948 |
| 1,959,748 | Svendsen | May 22, 1934 |
| 2,179,806 | Wegst et al. | Nov. 14, 1939 |
| 2,278,590 | Ruthruff | Apr. 7, 1942 |
| 2,364,015 | Winding | Nov. 28, 1944 |
| 2,384,563 | Roseman | Sept. 11, 1945 |

OTHER REFERENCES

Mellor, "Inorganic and Theoretical Chemistry," vol. 6, pp. 308, 311, 312. London, Longmans, Green and Co., 1925.